Patented June 21, 1938

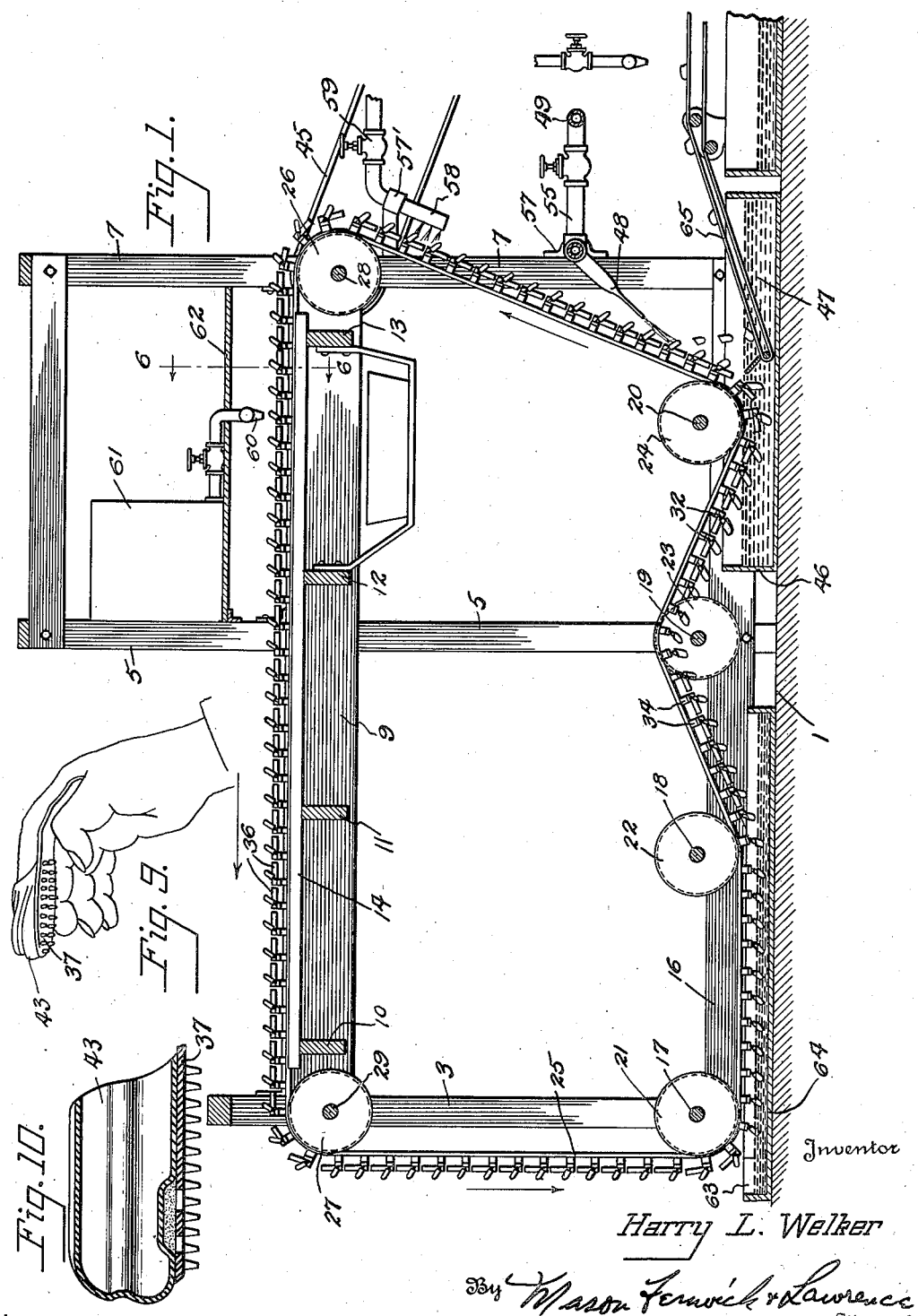

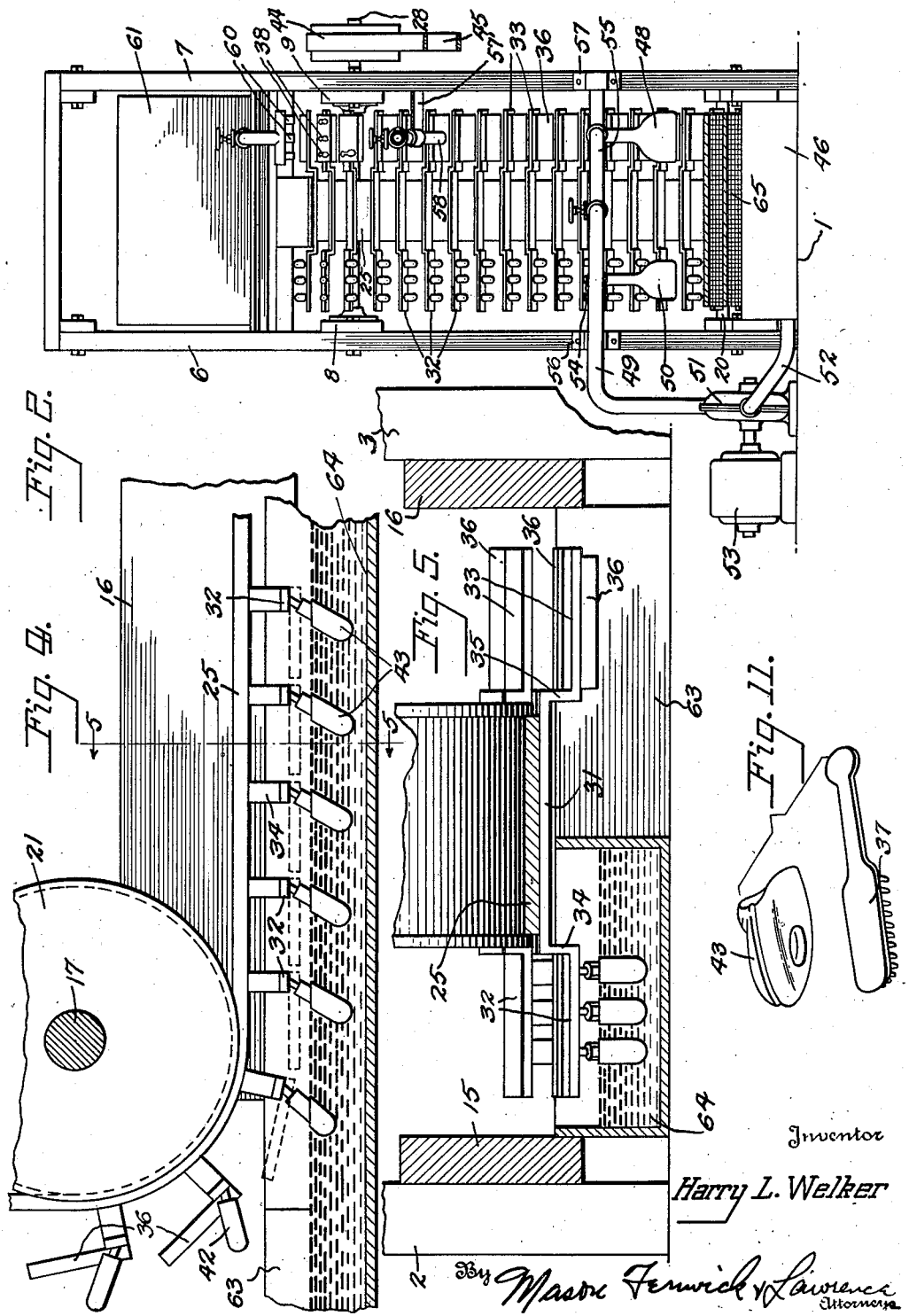

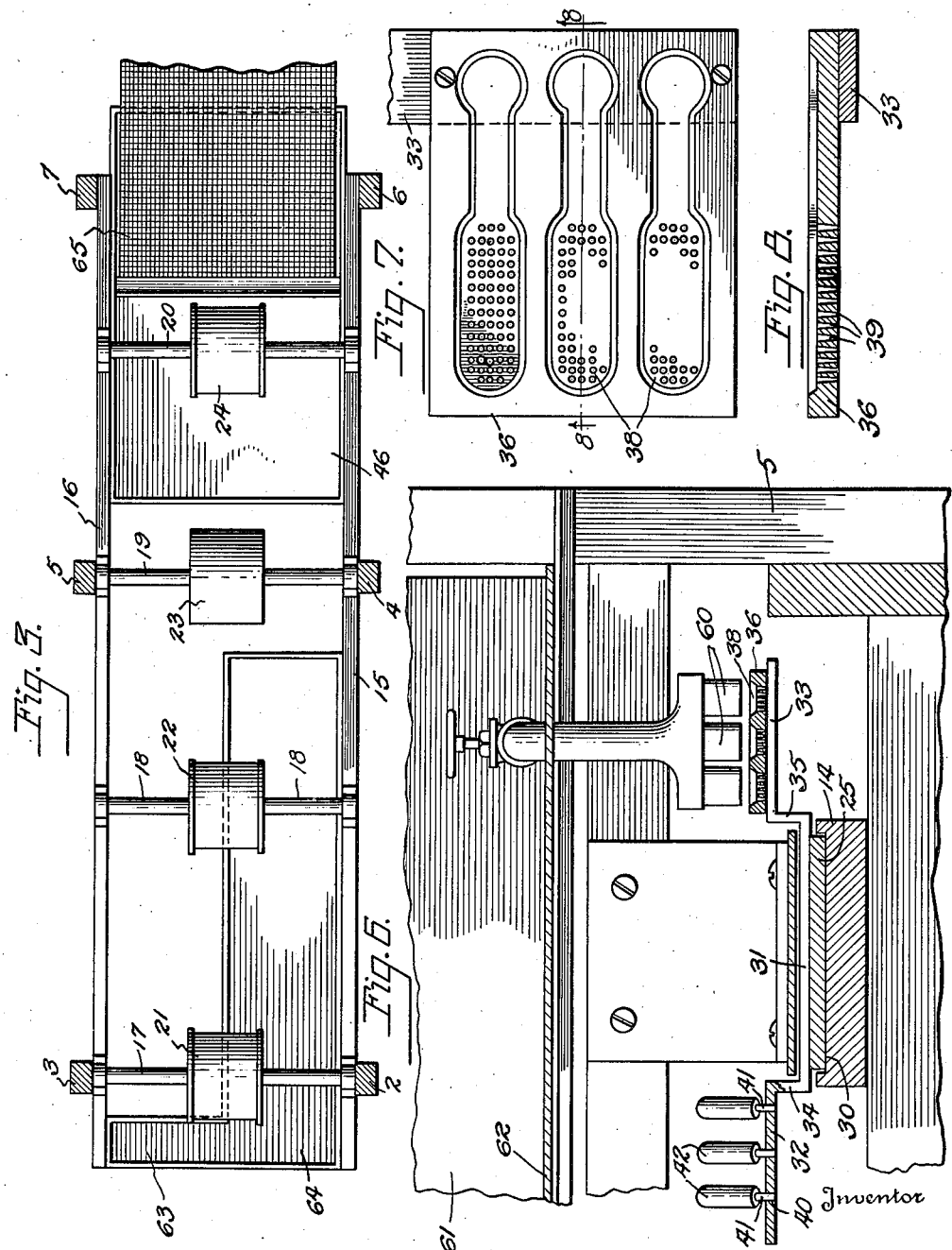

2,121,721

UNITED STATES PATENT OFFICE 2,121,721

PROCESS FOR MANUFACTURING ARTICLES FROM LATEX

Harry Logue Welker, Williamsport, Pa.

Application September 18, 1935, Serial No. 41,138

2 Claims. (Cl. 18—58)

This invention relates to processes and apparatus for manufacturing articles from rubber latex, and to the articles resulting from the practice of such processes.

Heretofore, in the manufacture of rubber tubes, gloves, balloons, and similar articles, shaped by the formation of a film of latex on a mold previously treated with coagulant, it has been the practice to leave such articles on their molds for a period of time sufficient to permit the films to set or coagulate to allow their removal from the molds without being torn. For most articles this setting period occupied about one and a half to two hours; and precluded anything in the nature of continuous manufacture. After stripping, the articles usually required a period of twenty-four hours of further setting or vulcanization.

The object of the present invention is to eliminate the setting period required before stripping of the articles from their molds; and to provide an apparatus and process by means of which the articles can be manufactured in great quantities by continuous operation.

The invention is peculiarly adapted for the manufacture of rubber toothbrushes of the cot type described in my copending application for "Dental cleaning and massage devices" Serial Number 34,470, filed August 2, 1935; and by way of illustration, the apparatus and process will be described in connection with the manufacture of the said device. However, it must not be understood as limited to such manufacture.

Other objects of my invention will become apparent as the detailed description thereof proceeds.

In the drawings:

Figure 1 is a somewhat diagrammatic side elevation of the apparatus for practicing this invention, parts of the said apparatus being shown in section;

Figure 2 is an end elevation of the apparatus shown in Figure 1;

Figure 3 is a horizontal section taken on the line 3—3 of Figure 1, parts being omitted to illustrate details of construction;

Figure 4 is a fragmentary side elevation to an enlarged scale of part of the said apparatus;

Figure 5 is a vertical transverse section taken on the line 5—5 of Figure 4;

Figure 6 is a vertical transverse section, to an enlarged scale, taken on the line 6—6 of Figure 1;

Figure 7 is a plan view of a mold forming part of the apparatus employed in the manufacture of the toothbrush aforesaid;

Figure 8 is a vertical section taken on the line 8—8 of Figure 7;

Figure 9 is a perspective view of the finished article as manufactured by this apparatus and process;

Figure 10 is a longitudinal section of the article illustrated in Figure 9; and

Figure 11 is an exploded perspective of the manufactured article, illustrating the parts thereof separated from each other.

Referring to the drawings, in which similar parts are designated by like numerals:

The apparatus comprises a floor or platform 1, having the standards 2, 3, 4, 5, 6, and 7 arranged in pairs and suitably secured to said platform at their lower ends. A runner 8 extends along and is suitably secured to the front standards 2, 4, and 6; and a runner 9 is likewise suitably secured to the rear standards 3, 5, and 7. The runners 8 and 9 are horizontal, and are arranged at the same height from the platform 1 to form longitudinal braces for the standards, and to support the cross bars 10, 11, 12, and 13, which carry the endless belt support 14.

A runner 15 extends along and is suitably secured to the front standards 2, 4, and 6; and a runner 16 is likewise secured to the rear standards 3, 5, and 7. The runners 15 and 16 are at the same height above the platform and constitute supports for bearings on which the shafts 17, 18, 19 and 20 are journaled for rotation. Pulleys 21, 22, 23, and 24 are suitably secured to the shafts 17, 18, 19, and 20, respectively, to form a support and guide for an endless conveyor belt 25, which extends around the aforesaid pulleys, and also around pulleys 26 and 27, suitably secured to shafts 28 and 29, respectively, journaled on the standards 3 and 7 substantially in alignment with the runners 8 and 9.

The conveyor belt 25 has the upper branch thereof mounted to slide in a guide groove 30 formed in the guide rail 15. From front to rear, the belt 25 extends over the pulley 26 along the guide rail 14, around and over the pulley 27, to and under the pulley 21, under the pulley 22, over the pulley 23, and under the pulley 24, and thence to the pulley 26.

The conveyor belt 25 has suitably secured thereto, and at short intervals lengthwise thereof, a series of U-shaped brackets 31, having flanges 32 and 33 extending laterally from the legs 34 and 35 thereof. On each bracket flange 33 there is secured a bristle mold 36 of a construction peculiarly adapted to form the bristle strip 37 (see Figure 11).

The mold plate 36 may have any desired number of mold impressions 38 formed thereon. These impressions or molds 38 are of peculiar construction, and adapt the apparatus for continuous use in the formation of rubber bristle strips. It has been found that when a mold of this type is coated with coagulant, and the bristle apertures 39 are made conical, the latex will flow to the bottom surface of the mold and stop there. This process of manufacturing bristle strips, eliminates the use of the heated dies which have heretofore been employed for molding strips of this character from rubber.

The other flange 32 of the bracket 31 is provided with a series of apertures 40, adapted to receive and hold the shanks 41 of the molds 42 for forming the cots 43, illustrated in Figure 11. The apertures 40 are equal in number to the number of mold impressions formed in the mold plate 36 carried by the flange 33. This is necessary merely to assure the manufacture of an equal number of cots and bristle strips at the same time. The spacing apart of the brackets 31 depends upon the length of the mold plates, which may be placed about a quarter of an inch apart lengthwise along the endless conveyor belt. Some spacing, of course, is necessary to permit the belt to turn around the various pulleys at the ends of the frame work.

The conveyor belt 25 may be driven through a pulley 44 fixed to the shaft 28, or to any other shaft of the conveyor system, by means of the belt 45 driven from any suitable source of power. In the practice of the process, and in order to give the bristles in the molds 38 time to set sufficiently, the belt should be driven at such rate as to occupy about one and one-half minutes in its movement between the pulleys 27 and 28. The cots 43 do not require any such extended period of time for the formation of their film; but on account of the intimate relation between the cots and strips, are of necessity carried along at the same rate as the aforesaid strips.

In the practice of the invention, the molds 38 and 42 are first coated with coagulant. To effect this coating, a trough 46, partly filled with coagulant 47, is arranged below the pulley 24 so that with the conveyor belt moving in the direction indicated by the arrows, Figure 1, both bristle and cot molds are immersed for a short period of time in the coagulant 47. As the belt moves upwardly from the coagulant 47 toward the roller 26, the mold plates 36 are sprayed with coagulant emerging from a nozzle 48, connected to a manifold 49. The cot molds 42 at the same time are sprayed with coagulant, emerging from the nozzle 50, also secured to the manifold 49. These sprays are forced under pressure from the nozzles 48 and 50 primarily for the purpose of stripping the molded articles from their molds.

The manifold 49 is connected at one end to a pump 51, having its inlet connected by a pipe 52 to the coagulant trough 47. A motor 53 operates the pump 51 to draw coagulant from the trough 47 and force it under pressure through the nozzles 48 and 50 against the molds on the conveyor belt 25. The coagulant is thus in a state of continuous circulation. The nozzles 48 and 50 are connected by valve controlled pipes 54 and 55, respectively, to the manifold 49. Brackets 56 and 57, extending from the standards 6 and 7, support the manifold and connected nozzles in fixed relation to the framework of the machine.

The nozzles will, of course, be inclined to the vertical at such angle as most effectively to strip the articles from their molds during the passage of the conveyor belt 25.

Directly above the coagulant nozzle 48, there is suitably mounted on a bracket 57, extending from the standard 7, an air spray 58, which is connected through a valve fitting 59 to any suitable source of air under pressure. The object of this air spray is to blow excess coagulant through the conical apertures 39 of the bristle molds as they travel upwardly toward the horizontal part of the conveyor.

As the conveyor belt 25 travels along the horizontal guide 14, the mold impressions 38 are filled with latex flowing continuously through the nozzles 60, depending from a tank 61, adapted to be filled with latex and suitably supported on a plate 62, extending between and supported by the standards 5 and 7. The rate of flow of the latex toward the molds may be controlled by any suitable valve mechanism connected to the supply pipe for the nozzles.

The rate of flow of latex from the tank 61 must, of course, be regulated in accordance with the rate of travel of the conveyor belt along the horizontal guide-way 14. During the passage of the belt from the tank 61 toward the rear of the machine, the latex becomes partially set; and as the belt assumes a vertical position at the end of the machine, the excess latex on the mold plates 36 drops into an extension 63 (see Figure 3), projecting laterally from a tank 64, which contains latex kept at a substantially constant level, for coating or forming a film upon the cot molds 42. The cot molds 42 are immersed for a period of about fifteen seconds in the latex in the tank 64. After passing under the pulley 22, the belt 25 rises over the pulley 23 and removes the cot molds from the latex.

It will be noted from Figure 3 of the drawings that the greater part of the tank 64 extends only half way between the front and rear standards of the frame work, while the coagulant tank 46 extends clear across the framework. This means that in the lower part of the apparatus the cots only are immersed in the latex in tank 64. Then, both cots and bristle strips become immersed under the pulley 24 in the coagulant 46. This second immersion of the molds and the films formed thereon, is the most important step in this process of manufacture; and is the step which enables the films to be stripped at once from their molds.

In carrying out this process, the molds are first coated with coagulant. Then, when the films are formed on the molds, they are again dipped in coagulant. The simultaneous action of coagulant through both sides of the film causes immediate hardening of both surfaces thereof, and permits the further manipulated steps regardless of whether the hardening has reached the deep portions of the film, which harden automatically in time through the action of the absorbed coagulant.

As the coagulant is poisoned, it has been customary to wash the coagulant from the finished article with water. If this washing with water were effected in the present instance immediately after the second application of coagulant, it would necessitate a re-application of coagulant to the molds after stripping of the films therefrom. Therefore, to avoid this unnecessary step, the films are removed from their molds by a spray of coagulant, and fall into the coagulant tray 47, preferably upon an endless carrier belt or screen 65, which removes the films or finished article from the said tank 47 to any other part of the plant where they may be washed with water and stored for further vulcanization or curing, as may be found necessary. The period of vulcanization or curing will depend, of course, upon whether the latex has been provided with vulcanizing materials to hasten the process.

It will be obvious that where the articles are all of the same type, the same kind of molds may be arranged on both flanges of the U-shaped bracket 31; and the process can be speeded since it is only necessary to immerse the molds, such as the molds 42, for a period of about one and a half seconds, in the latex. Molds of the type illustrated in Figures 7 and 8 of the drawings for forming bristles will, of necessity, require a greater period of time to permit the formation and setting of the bristles, during a period of horizontal travel, wherein the latex must be permitted to flow by gravity into the conical bristle apertures. After the proper curing or vulcanization of the cots and bristle strips, the two may be secured together by the usual cementing process. Of course, the depression in the cot mold must first be filled with tooth paste or powder and the bristle strip must be slit to permit the outlet of the toothpaste or powder when pressure is applied within the cot to the projection formed by said depression.

So far as the apparatus is concerned, it will be obvious that the construction thereof may be varied indefinitely to suit the characteristics of the article to be manufactured thereby. The essential step in the process, however, cannot be varied; that is, the step of applying coagulant to a mold must be followed by the formation of a film of latex on the coagulant treated mold, and then when the film is properly formed on the mold, it must be again immersed or coated with coagulant, prior to any further hardening or vulcanization of the finished product.

What I claim is:

1. The process of molding rubber articles, which consists in coating a mold with a coagulant, applying rubber latex to the coagulant coating to form a film of rubber thereon, coating the rubber film with coagulant, and applying a stream of coagulant under pressure to remove the coagulated film from the mold and apply coagulant to the stripped mold.

2. The process of molding rubber articles, which consists in coating a mold with a coagulant, applying rubber latex to the coagulant coating to form a film of rubber thereon, coating the rubber film with coagulant, and applying a stream of coagulant under pressure to remove the coagulated film from the mold and apply coagulant to the stripped mold, and washing the coagulated rubber film to remove excess coagulant therefrom.

HARRY LOGUE WELKER.